(12) United States Patent
Vilaipornsawai et al.

(10) Patent No.: US 9,768,839 B2
(45) Date of Patent: Sep. 19, 2017

(54) SYSTEM AND METHOD FOR DOWNLINK OPEN-LOOP MULTI-USER COORDINATED MULTIPOINT TRANSMISSION USING SPARSE CODE MULTIPLE ACCESS

(71) Applicant: Huawei Technologies Co., Ltd., Shenzhen (CN)

(72) Inventors: Usa Vilaipornsawai, Nepean (CA); Hosein Nikopour, San Jose, CA (US); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/860,476

(22) Filed: Sep. 21, 2015

(65) Prior Publication Data

US 2016/0087694 A1   Mar. 24, 2016

Related U.S. Application Data

(60) Provisional application No. 62/052,989, filed on Sep. 19, 2014.

(51) Int. Cl.
*H04B 7/024* (2017.01)
*H04L 25/03* (2006.01)
(Continued)

(52) U.S. Cl.
CPC ....... *H04B 7/024* (2013.01); *H04L 25/03898* (2013.01); *H04B 7/0417* (2013.01); *H04L 5/0035* (2013.01)

(58) Field of Classification Search
CPC . H04B 7/024; H04B 7/0417; H04L 25/03898; H04L 5/0035
See application file for complete search history.

(56) References Cited

U.S. PATENT DOCUMENTS

| 2012/0044849 A1* | 2/2012 | Farmanbar ............. H04B 7/024 370/312 |
| 2012/0051250 A1* | 3/2012 | Sun ..................... H04L 41/5032 370/252 |

(Continued)

OTHER PUBLICATIONS

Zhang, et al., "DM-RS Based Open-Loop CoMP in LTE-A System," Vehicular Technology Conference (VTC Spring), May 6-9, 2012 IEEE, 5 pages.

(Continued)

*Primary Examiner* — Mohammad Anwar
(74) *Attorney, Agent, or Firm* — Slater Matsil, LLP

(57) ABSTRACT

Embodiments are provided to enable downlink open-loop multi-user coordinated multipoint (MU-CoMP) transmission using sparse code multiple access (SCMA). In an embodiment, a network controller selects, in a cluster of multiple transmission points (TPs) and multiple user equipment (UEs), a MU-CoMP with SCMA transmission mode and a UE paring scheme for data transmission from a set of TPs to a set of UEs. The controller schedules the set of UEs for data transmission from the set of TPs, including coordinating and allocating, for each TP in the set of TPs, a plurality of SCMA layers to the UEs in accordance with the selected MU CoMP with SCMA transmission mode. The controller also determines values for control signaling based on the scheduling. The control signaling configures the set of UEs to detect the data transmission from the TPs.

37 Claims, 7 Drawing Sheets

(51) Int. Cl.
*H04B 7/0417* (2017.01)
*H04L 5/00* (2006.01)

(56) References Cited

U.S. PATENT DOCUMENTS

| | | | |
|---|---|---|---|
| 2012/0069824 A1* | 3/2012 | Papadopoulos | H04B 7/024 370/336 |
| 2012/0113852 A1* | 5/2012 | Xu | H04L 5/0048 370/252 |
| 2012/0257664 A1 | 10/2012 | Yue et al. | |
| 2013/0039199 A1 | 2/2013 | Liao et al. | |
| 2013/0039349 A1 | 2/2013 | Ebrahimi Tazeh Mahalleh et al. | |
| 2013/0315156 A1 | 11/2013 | Xiao et al. | |
| 2014/0169408 A1* | 6/2014 | Bayesteh | H04B 7/0473 375/144 |
| 2015/0282185 A1* | 10/2015 | Nikopour | H04L 1/0002 370/329 |

OTHER PUBLICATIONS

Liu, et al., "Proportional Fair Scheduling for Multi-Cell Multi-User MIMO Systems," 2010 44th Annual Conference on Information Sciences and Systems (CISS), Mar. 17-19, 2010 IEEE, 6 pages.

Liu, et al., "Downlink MIMO in LTE-Advanced: SU-MIMO vs. MU-MIMO," LTE-Advanced and 4G Wireless Communications, IEEE Communications Magazine, vol. 50, Issue 2, Feb. 2012, pp. 140-147.

Nikopour, et al., "Multi-User, Multiple Access, Systems, Methods, and Devices," U.S. Appl. No. 14/670,182, 51 pages.

Vilaipornsawai, et al., "SCMA for Open-Loop Joint Transmission CoMP," Cornell University Library, submitted Apr. 7, 2015, 5 pages.

\* cited by examiner

SYSTEM AND METHOD FOR DOWNLINK OPEN-LOOP MULTI-USER COORDINATED MULTIPOINT TRANSMISSION USING SPARSE CODE MULTIPLE ACCESS

This application claims the benefit of U.S. Provisional Application No. 62/052,989 filed on Sep. 19, 2014 by Usa Vilaipornsawai et al. and entitled "System and Method for Downlink Open-Loop Multi-User Coordinated Multipoint Transmission," which is hereby incorporated herein by reference as if reproduced in its entirety.

TECHNICAL FIELD

The present invention relates generally to wireless communications, and, in particular embodiments, to a system and method for downlink open-loop multi-user coordinated multipoint (MU-CoMP) transmission using sparse code multiple access (SCMA).

BACKGROUND

To support high capacity demand and new applications in evolving networks such as fifth generation (5G) wireless networks, ultra-dense networks (UDN) and moving networks (MN) are being developed. Such network architectures are challenged by high capacity demand, sever inter-cell interferences, frequent handovers, and fast moving users, among other challenges. Technologies, such as Coordinated multipoint (CoMP) or Joint transmission (JT) CoMP, Coordinated beam forming/scheduling (CB/CS) CoMP, and multi-user multiple-input and multiple-output (MU-MIMO) based on beam forming are being proposed to alleviate such challenges. However, CoMP and MU-MIMO schemes are closed-loop schemes, requiring channel state information (CSI) feedback with high overhead. The CSI feedback is also sensitive to channel aging and feedback error. Sparse Code Multiple Access (SCMA) is a transmission scheme with relatively low complexity receiver design and good performance. SCMA can offer high spectral efficiency by supporting overloaded systems having more users or traffic than resources. A Multi-user SCMA (MU-SCMA) scheme can also increase throughput and coverage, and support open-loop (OL) user multiplexing with low feedback overhead. There is a need for efficient schemes to implement OL MU-SCMA with CoMP transmission to benefit from the low complexity of the SCMA scheme and overcome some of the challenges of typical CoMP systems.

SUMMARY OF THE INVENTION

In accordance with an embodiment, a method for enabling open-loop multi-user coordinated multipoint (CoMP) transmission using sparse code multiple access (SCMA) includes selecting, at a network controller in a cluster of multiple transmission points (TPs) and multiple user equipment (UEs), a multi-user (MU) CoMP with SCMA transmission mode and a UE paring scheme for data transmission from a set of TPs to a set of UEs. The MU CoMP with SCMA transmission mode is selected in accordance with a criterion. The method further includes scheduling the set of UEs for data transmission from the set of TPs by coordinating and allocating, for each TP in the set of TPs, a plurality of SCMA layers to the set of UEs in accordance with the selected MU CoMP with SCMA transmission mode. A plurality of values for a control signaling are also determined based on the scheduling. The control signaling configures the set of UEs to detect the data transmission from the set of TPs, and is assigned to the set of TPs with the determined values.

In accordance with another embodiment, a method for enabling open-loop MU-CoMP-SCMA transmission includes receiving, at a TP from a network controller, a plurality of values for a control signaling assigned to the TP, and transmitting the control signaling to a set of UEs associated with the TP. The control signaling includes scheduling information for the set of UEs to detect a transmission from a set of TPs in accordance with a selected MU-CoMP-SCMA transmission mode and a UE paring scheme. The values include a number and indices of SCMA layers of each TP in the set of TPs.

In accordance with another embodiment, a method for enabling open-loop MU-CoMP-SCMA transmission includes receiving, at a UE, a control signaling for scheduling in accordance with a selected MU-CoMP-SCMA transmission mode and a UE paring scheme, and detecting a data transmission from a set of TPs in accordance with the selected MU-CoMP-SCMA transmission mode and the UE paring scheme. The control signaling indicates a number and indices of SCMA layers of each TP in the set of TPs.

In accordance with another embodiment, a network controller for enabling open-loop multi-user CoMP transmission using SCMA includes a processor coupled to a memory, and a non-transitory computer readable storage medium storing programming for execution by the processor. The programming includes instructions to select, for a cluster of multiple TPs and multiple UEs, a multi-user (MU) CoMP with SCMA transmission mode and a UE paring scheme for data transmission from a set of TPs to a set of UEs. The MU CoMP with SCMA transmission mode is selected in accordance with a criterion. The programming also includes schedule the set of UEs for data transmission from the set of TPs by coordinating and allocating, for each TP in the set of TPs, a plurality of SCMA layers to the set of UEs in accordance with the selected MU CoMP with SCMA transmission mode. The instructions also include determining a plurality of values for control signaling based on the scheduling, and assigning the control signaling to the set of TPs with the determined values. Thee control signaling configures the set of UEs to detect the data transmission from the set of TPs.

In accordance with another embodiment, a TP supporting open-loop multi-user CoMP transmission using SCMA includes a processor coupled to a memory, and a non-transitory computer readable storage medium storing programming for execution by the processor. The programming includes instructions to receive, from a network controller, a plurality of values for a control signaling assigned to the TP, and transmit the control signaling to a set of UEs associated with the TP. The control signaling includes scheduling information for the set of UEs to detect a transmission from a set of TPs in accordance with a selected MU CoMP with SCMA transmission mode and a UE paring scheme. The values include a number and indices of SCMA layers of each TP in the set of TPs.

In accordance with yet another embodiment, a UE supporting open-loop multi-user CoMP transmission using SCMA includes a processor coupled to a memory, and a non-transitory computer readable storage medium storing programming for execution by the processor. The programming includes instructions to receive a control signaling for scheduling in accordance with a selected MU CoMP with SCMA transmission mode and a UE paring scheme, and detect a data transmission from a set of TPs in accordance with the selected MU CoMP with SCMA transmission mode and the UE paring scheme. The control signaling indicates a number and indices of SCMA layers of each TP in the set of TPs.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Sparse code multiple access (SCMA) is a non-orthogonal multiple access scheme, using sparse codebooks to convey user data symbols. By assigning sparse codebooks to different users or data symbols, SCMA can support overloaded systems (e.g., with more users/traffic than resources), using an advanced receiver with reasonable complexity. Such reasonable complexity is made possible by the sparsity of SCMA codebooks. Further, the capability to separate users in code-domain of SCMA makes it suitable for Coordinated Multipoint (CoMP) transmission scenarios to improve the wireless signal coverage. The coverage improvement can be translated to improve in users' experience. A first user equipment (UE) can receive data symbols from different Transmitter Points (TPs), which can use different or the same codebooks. Each TP can also support multiple users (MU) by assigning different codebooks to different users. The term TP is also used herein to indicate a coverage range of a TP.

Embodiments are provided herein to enable downlink open-loop MU-CoMP transmission using SCMA, also referred to herein as MU-SCMA-CoMP. The embodiments include schemes for detection strategy, power sharing factor optimization, user pairing, and scheduling. The schemes take advantage of SCMA to support MU using different sets of codebooks. The schemes can be implemented without knowledge of channel state information (CSI), only required channel quality indicator (CQI), due to their open-loop nature. The schemes are suited for high mobility applications, such as for 5G systems including Vehicle to Vehicle (V2V) or high mobility applications, for example.

In downlink MU-SCMA-CoMP, the SCMA layers are shared among multiple UEs, hence, transmit power needs to be shared among UEs. Any UE can receive data from multiple TPs. In MU-CoMP scenarios, transmission should be optimized for multiple UEs and multiple TPs as a whole. Multiple UE/TP pairing scenarios for MU-SCMA-CoMP can be considered, including remote pairing, local pairing, and dual pairing.

Figure 1:
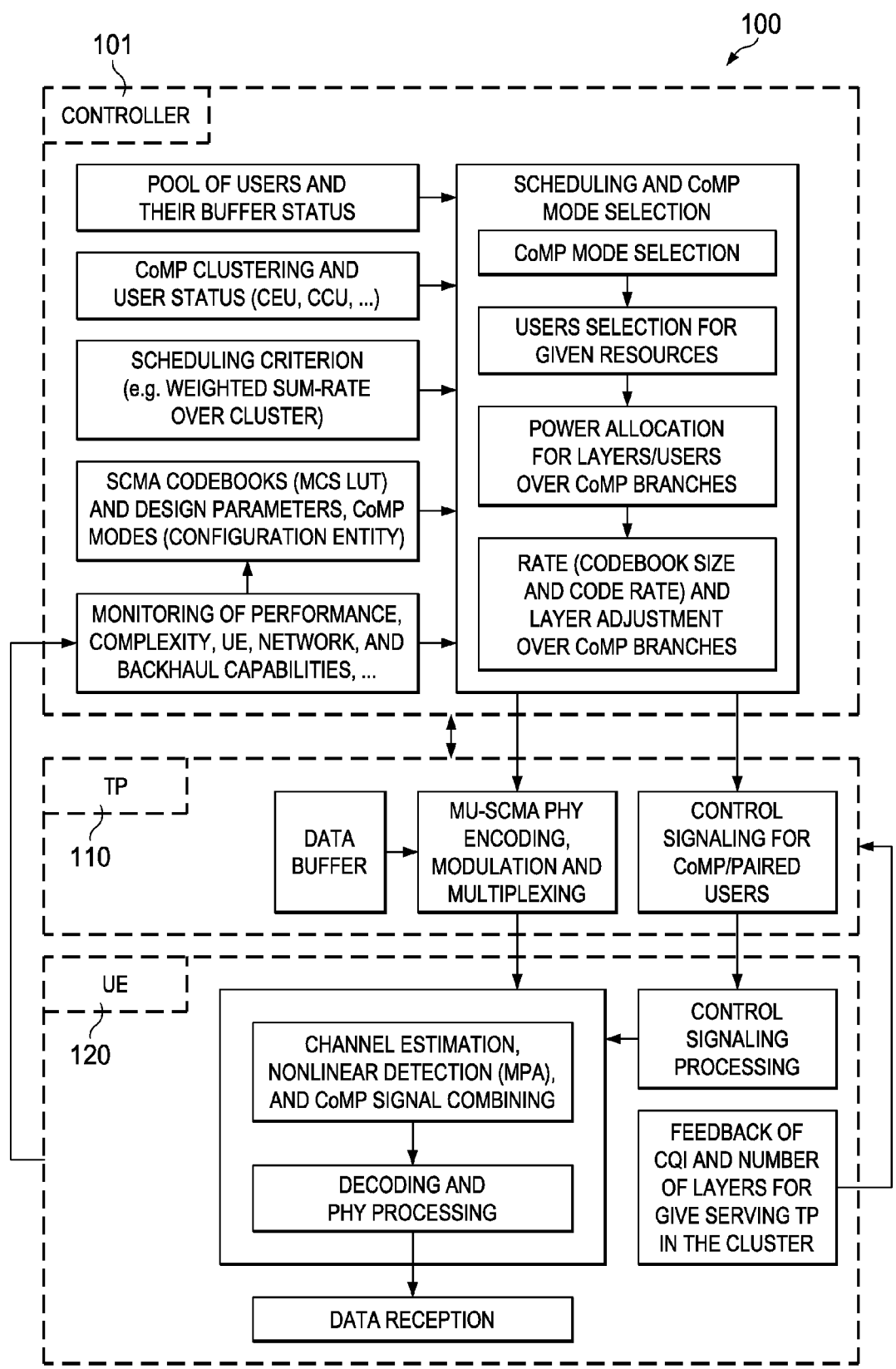
FIG. 1 illustrates an embodiment of an OL MU-CoMP system with SCMA.

FIG. 1 shows an embodiment of an OL MU-CoMP system 100 with downlink SCMA. Using the SCAM scheme removes the requirement of channel state information (CSI) feedback from each UE to establish a precoding matrix for CoMP transmission. Using only CQI, instead of using CSI required in obtaining a precoding matrix, CoMP transmission modes for each TP can be achieved by identifying a plurality of possible configurations for SCMA CoMP transmission from multiple TPs to multiple UEs. The modes considered can include non-CoMP modes such as single-user (SU) or multi-user (MU) SCMA modes, SU-CoMP (with multiple TPs transmitting jointly to a single UE) with SCMA, and multiple MU-CoMP (with multiple TPs transmitting jointly to multiple UEs) schemes with SCMA. The system 100 supports Radio Resource Control (RRC) signaling to establish the SCMA CoMP transmission mode and the different configurations of this mode. The MU-SCMA-CoMP schemes can include local-pairing, remote-pairing and dual pairing schemes, as described below. Other suitable transmission modes can also be considered. Hence, the UEs can be scheduled for transmission by coordinating/allocating SCMA layers to the UEs based on one or more transmission modes, e.g., dynamically at every scheduling interval.

In the system 100, a network controller 101 configures downlink MU-SCMA-CoMP between multiple TPs 110 and multiple UEs 120, in a network cluster. Each UE 120 returns a channel quality indicator (CQI) feedback and the number of detected SCAM layers for that. The CQI feedback is forwarded by the TPs 110 to the controller 101. The controller 101 also uses this feedback information for each UE 120 and TP 110 pair to configure the scheduling and CoMP mode selection in the entire cluster (between all considered TPs 110 and UEs 120). In addition to the CoMP mode selection, the configuration includes users selection for given resources, power allocation for SCMA layers, and rate and layer adjustment. The configuration parameters are passed to the respective TPs 110 to adjust encoding, modulation, multiplexing and control signaling for CoMP/paired users. The UEs 120 use the control signaling for detection.

Figure 2:
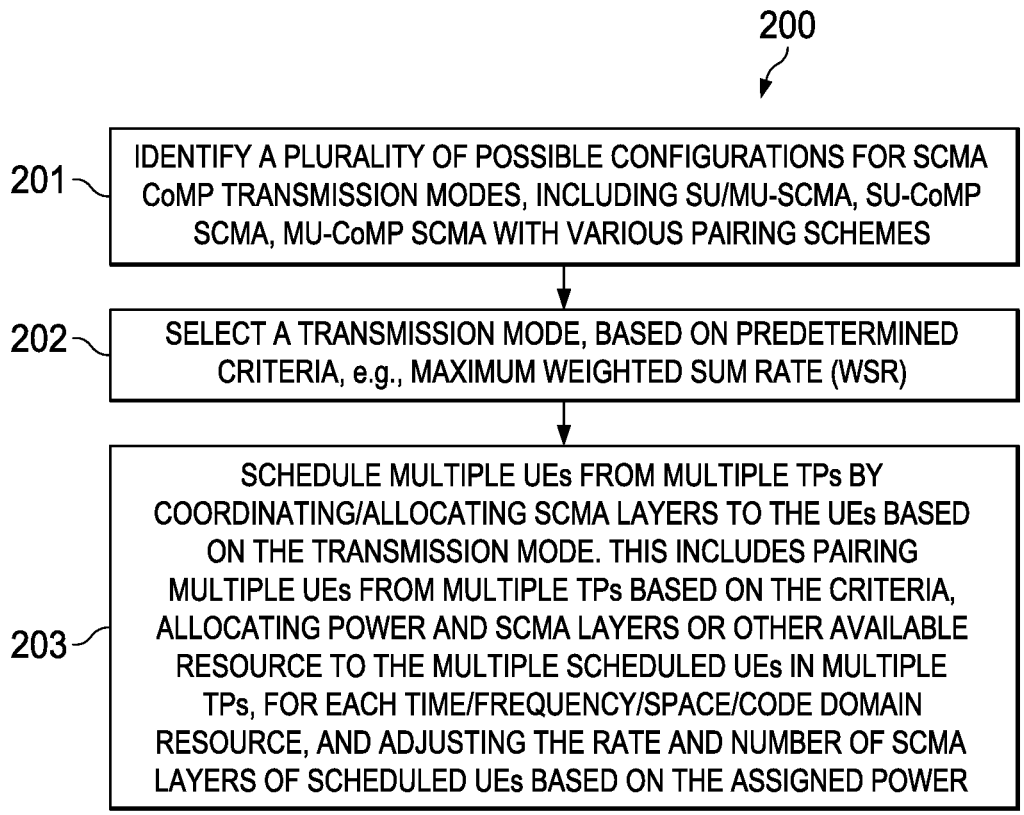
FIG. 2 illustrates an embodiment of a method for determining an OL MU-CoMP SCMA transmission mode and its configuration.

FIG. 2 shows an embodiment method 200 for determining an OL MU-SCMA-CoMP transmission mode and its configuration. The method 200 can be performed in the system 100, e.g., at the controller 101. At step 201, a plurality of possible configurations for SCMA CoMP transmission modes is identified, including SU/MU-SCMA, SU-SCMA-CoMP, MU-SCMA-CoMP with various pairing schemes. At step 202, the controller selects a transmission mode, based on predetermined criteria, e.g., maximum weighted sum rate (WSR). At step 203, multiple UEs from multiple TPs are scheduled by coordinating/allocating SCMA layers to the UEs based on the determined transmission mode. This step can be performed dynamically every scheduling interval. The scheduling includes pairing multiple UEs from multiple TPs based on the criteria, and allocating power and SCMA layers or other available resource to the multiple scheduled UEs in multiple TPs, for each given time, frequency, and/or space domain resource, The scheduling also includes adjusting the rate and number of SCMA layers of scheduled UEs based on the assigned power.

Figure 3:
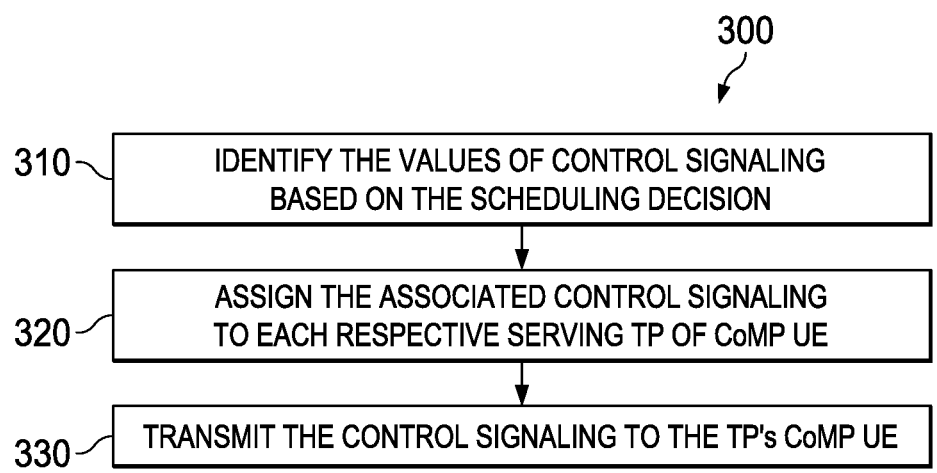
FIG. 3 illustrates an embodiment of a method enabling control signaling for detection at the scheduled UEs.

FIG. 3 shows an embodiment method 300 enabling control signaling for detection at the scheduled UEs. The method 300 can be performed in the system 100, e.g., at the controller 101 and the TPs 110. This control signaling is required for the detection of scheduled UEs in the OL MU-SCMA-CoMP transmission mode. At step 310, the controller determines the values of control signaling based on the scheduling decision. The values can include the selected CoMP transmission mode, and for each CoMP UE, the number of TPs in CoMP transmission points, the indices of TPs in CoMP transmission points, the number of layers of each TP in CoMP transmission points, the indices of layers of each TP in CoMP transmission points. The values also include for each CoMP TP of each CoMP UE, the power sharing factor of each layer, the codebook size of each layer, and the code rate of each layer. Only a portion of this signaling may be required as some information may be detected blindly by the UEs. At step 320, the controller assigns the associated control signaling to each respective serving TP of CoMP UE. At step 330, the serving TP transmits the control signaling to its CoMP UE.

Figure 4:
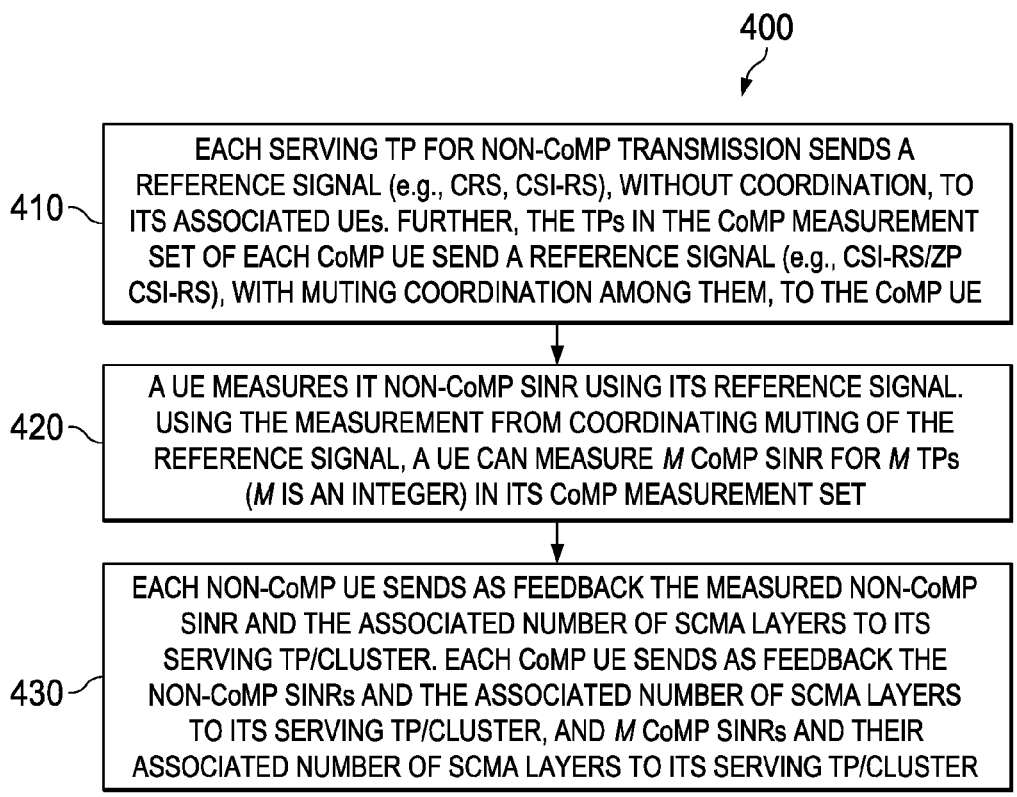
FIG. 4 shows an embodiment of a method to measure and send feedback information to support OL MU-SCMA-CoMP transmission.

FIG. 4 shows an embodiment method 400 to measure and send feedback information to support OL MU-SCMA-CoMP transmission. The method 400 includes measuring and sending as feedback CQIs from a UE to its serving TP or cluster. The CQI indicates a measured signal-to-interference-plus-noise (SINR) and number of SCMA layers by a UE. The method 400 can be performed in the system 100, e.g., at each TP and UE. At step 410, each serving TP for non-CoMP transmission sends a reference signal (e.g., CRS, CSI-RS), without coordination. Further, the TPs in the CoMP measurement set of each CoMP UE send a reference signal (e.g., CSI-RS/ZP CSI-RS), with muting coordination among them, to the CoMP UE. At step 420, a UE measures it non-CoMP SINR using its reference signal. The non-CoMP SINR is the signal power from a serving TP to the interference power from all other TPs plus noise power. Using the measurement from coordinating muting of the reference signal, a UE can measure M CoMP SINR for M TPs (M is an integer). The CoMP SINR is the signal power from a TP in the CoMP measurement set (e.g., with M TPs) to the interference power from outside of the CoMP measurement set plus noise power. At step 430, each non-CoMP UE sends as feedback the measured non-CoMP SINR and the associated number of SCMA layers to its serving TP/cluster. The non-CoMP SINR is required in MU-SCMA. Each CoMP UE sends as feedback the non-CoMP SINRs and the associated number of SCMA layers to its serving TP/cluster, and M CoMP SINRs and their associated number of SCMA layers to its serving TP/cluster. The M CoMP SINRs are required in MU-SCMA-CoMP. The value of the SINR may be quantized and predefined in a set. A number of SCMA layers may also be predefined in a set. The feedback rate of the SINRs and the number of SCMA layers may be different.

In downlink transmission for a CoMP UE, data associated with SCMA layers from multiple TPs are jointly detected. For multiple co-paired UEs/SCMA links, each scheduled UE performs joint detection for all SCMA layers from all links. Using a successive interference cancellation (SIC) detection scheme, the UEs can be ordered in increasing performance metric, e.g., channel qualities based on CQI feedback. Accordingly, a first UE in the order detects its data associated with SCMA layers by assuming every other UE's layers are interferences. The second UE first detects the first UE data (with lower channel quality), re-encodes/cancels the data from its signal, and then its own data considering data layers from the rest of UEs are interferences. Any remaining UEs in the order proceed in a similar manner.

Figure 5:
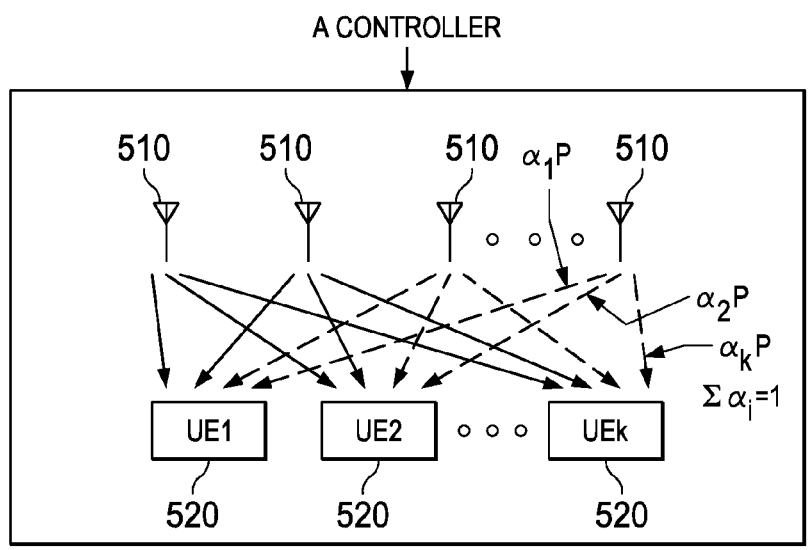
FIG. 5 shows an embodiment of a UE paring scenario for MU-SCMA-CoMP transmission.

FIG. 5 shows an embodiment of a UE paring scenario for MU-SCMA-CoMP transmission. The scenario may be applied in a wireless network where multiple UEs 520 are not necessarily associated with TPs or cells serviced by TPs. For instance, the UEs 520 may be moving across one or more wireless networks and TPs, such as UEs in a vehicle, train or airplane. The multiple UEs 520 (at least two UEs) can be paired together to receive CoMP-SCMA transmission from multiple TPs 510, e.g., which are within sufficient proximity with the UEs. For instance, n UEs are served by m TPs (n and m are integers), and each UE of the n UEs is served by up to m TPs. A network controller (not shown) can establish a link between each TP 510 and UE 520 by assigning a suitable number of SCMA layers and power sharing factor to the link. Other resource can also be assigned to the link for each given time, frequency, and/or space resource.

Figure 6:
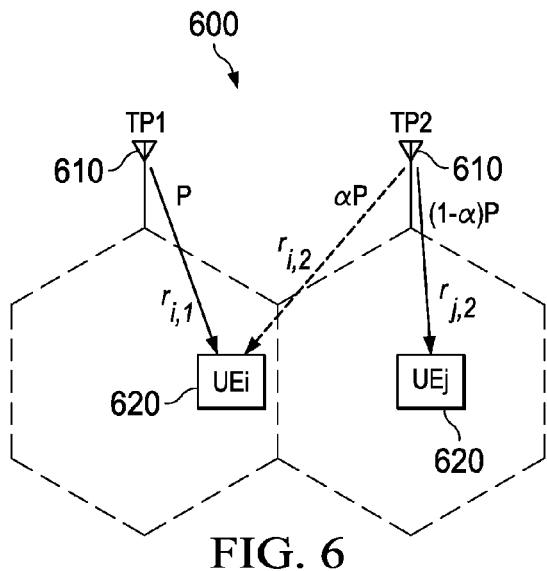
FIG. 6 illustrates an embodiment of MU-SCMA-CoMP remote pairing.

FIG. 6 shows an embodiment of a MU-SCMA-CoMP remote pairing scenario. Different data streams may be transmitted from different TPs to CoMP UEs using a Spatial Multiplexing (SM) scheme. Alternatively, same data stream may be transmitted from the TPs to the UEs using a transmission diversity scheme. A first UE 620, designated UE i, is assumed to be a cell-edge UE 620 in a first TP 610, designated TP1, and having low SINR. A second UE 620, designated UE j, is a cell-center UE 620 of a second TP 610, designated TP2, and having high SINR. The cell-edge UE 620 with low SINR and the cell-center UE 620 with high SINR are also referred to as bad UE and good UE, respectively. In this scenario, TP2 can serve the cell-edge UE 620 of TP1 by assigning a transmit power of $P_{i,TP2} = \alpha P$ to that UE, while serving its own cell-center UE 620 with $P_{j,TP2} = (1-\alpha)P$, where $\alpha$ is a power sharing factor that needs to be optimized. With SCMA, it is possible to share layers, apart from sharing power among these users.

Let $y_{i,TP1}$ denote the received signal at UE i associated with TP1 based on the multiple-input and multiple-output (MIMO) and linear-equivalent of SCMA model, $y_i$ can be represented as:

$$y_{i,TP1} = \sqrt{\frac{P}{J_{i,TP1}}} H_{i,TP1,i,TP1} q_{i,TP1} + \sqrt{\frac{\alpha P}{J_{i,T2}}} H_{i,TP2,i,TP2} q_{i,TP2} + \left( \sqrt{\frac{(1-\alpha)P}{J_{j,T2}}} H_{i,TP2,j,TP2} q_{j,TP2} + n_{i,TP1} \right), \quad (1)$$

where $H_{i,TP1,i,TP1}$ and $H_{i,TP2,i,TP2}$ are the known channel matrices for UE i from TP1 and for UE i from TP2, respectively, $q_{i,TP1}$ and $q_{i,TP2}$ are the corresponding vectors of normalized Quadrature amplitude modulation (QAM) symbols, $J_{i,T2}$ and $j_{j,T2}$ are the numbers of signatures for UE i from TP1 and TP2, respectively, $q_{j,TP2}$ is the transmitted symbol vector of UE j from TP2, and $n_{i,TP1}$ is the interference plus noise signal at UE i in TP1.

By treating the signal for UE j sent from TP2 as noise in multiple access channel (MAC), the adjusted rate (based on $\alpha$) at UE i can be expressed as $\tilde{r}_i = \log_2 \det(I + R^{-1} H'H'^H)$ using a joint detection, where $$H' = \left[ \sqrt{\frac{P}{J_{i,TP1}}} H_{i,TP1,i,TP1} \sqrt{\frac{\alpha P}{J_{i,T2}}} H_{i,TP2,i,TP2} \right]$$

and the covariance matrix of interference plus noise is given by $$R = N_i I + \frac{(1-\alpha)P}{J_{j,TP2}} H_{i,TP2,j,TP2} H_{i,TP2,j,TP2}^H.$$

The successive interference cancellation (SIC) detection can be used to achieved a corner point of the MAC capacity region, where the data rates can be separately expressed at UE i from TP1 and TP2, respectively, as $$\tilde{r}_{i,TP1} = \log_2 \det\left( I + \frac{P}{J_{i,TP1}} R_{i,TP1}^{-1} H_{i,TP1,i,TP1} H_{i,TP1,TP1}^H \right) \quad (2)$$

$$\tilde{r}_{i,TP2} = \log_2 \det\left( I + \frac{\alpha P}{J_{i,TP2}} R_{i,TP2}^{-1} H_{i,TP2,i,TP2} H_{i,TP2,TP2}^H \right) \quad (3)$$

where $$R_{i,TP1} = N_i I + \frac{(1-\alpha)P}{J_{j,TP2}} H_{i,TP2,j,TP2} H_{i,TP2,j,TP2}^H,$$

$$R_{i,TP2} = N_i I + \frac{P}{J_{i,TP1}} H_{i,TP1,i,TP1} H_{i,TP1,i,TP1}^H + \frac{(1-\alpha)P}{J_{j,TP2}} H_{i,TP2,j,TP2} H_{i,TP2,j,TP2}^H.$$

The vector $N_i$ is the noise plus interference power at UE i. The data for UE i from TP2 is first detected, treating signals for UE i from TP1 and UE j from TP2 as interferences. The data for UE i from TP1 is then detected, assuming only the signal for UE j from TP2 as interference. The signal for UE i from TP2 is assumed to be detected and cancelled out from the received signal.

By considering the interference plus noise as white noise, the following approximations can be made: $R_{i,TP1} \approx (1 + (1-\alpha)\gamma_{i,TP2}^{CoMP})I$ and $R_{i,TP2} \approx (1 + \gamma_{i,TP1}^{CoMP} + (1-\alpha)\gamma_{i,TP2}^{CoMP})I$, where the CoMP SINR (for SIMO system) is defined as $$\gamma_{i,TPk}^{CoMP} = \frac{\|h_{i,TP2}\|^2 P}{N_{i,TPk}^{CoMP}}, \; TPk.$$

with $N_{i,TP1}^{CoMP}$ being noise plus interference power from all cells outside a CoMP set of user i in $$\tilde{r}_{i,TP1} \approx \log_2 \det\left( I + \frac{\gamma_{i,TP1}^{CoMP}}{J_{i,TP1}(1 + (1-\alpha)\gamma_{i,TP2}^{CoMP})} S_{i,TP1}^H S_{i,TP1} \right) \text{ and}$$

$$\tilde{r}_{i,TP2} \approx \log_2 \det\left( I + \frac{\alpha \gamma_{i,TP2}^{CoMP}}{J_{i,TP2}(1 + \gamma_{i,TP1}^{CoMP} + (1-\alpha)\gamma_{i,TP2}^{CoMP})} S_{i,TP2}^H S_{i,TP2} \right).$$

With this assumption, the following rate approximations can be made:

The broadcast channel can be considered part of the system, which is the TP2 transmit super-positioned signal to users i, j, while the signal for UE i is treated from TP1 as interference. The value $y_{j,TP2}$ denotes the received signal at user j associated with TP2 as:

$$y_{j,TP2} = \sqrt{\frac{\alpha P}{J_{i,T2}}} H_{j,TP2,i,TP2} q_{i,TP2} + \sqrt{\frac{(1-\alpha)P}{J_{j,T2}}} H_{j,TP2,j,TP2} q_{j,TP2} + \left( \sqrt{\frac{P}{J_{i,TP1}}} H_{j,TP1,i,TP1} q_{i,TP1} + n_{j,TP2} \right). \quad (4)$$

To simplify analysis, an equivalent low density spreading (LDS) is approximated by a degraded model assuming the interference plus noise as white noise. Thus, the SIC detection can be used and is ordered by users with increasing SINRs. Assume $\gamma_{j,TP2}^{CoMP} > \gamma_{i,TP2}^{CoMP}$, then the SIC detection can be performed at UE j. This means that the data for user i from TP2 with lower $\gamma_{i,TP2}^{CoMP}$ is detected first, assuming the signal for this user from TP1 and that for UE j for TP2 as interferences. In this degraded system with $\gamma_{j,TP2}^{CoMP} > \gamma_{i,TP2}^{CoMP}$, the data for user i from TP2 can be detected at user j and canceled out. Hence, the achievable rate at this good UE j can be approximated by $$\tilde{r}_{j,TP2} \approx \log_2 \det\left( I + \frac{(1-\alpha)\gamma_{j,TP2}}{J_{j,TP2}} S_{j,TP2}^H S_{j,TP2} \right),$$

where $\gamma_{j,TP2} = \frac{|h_{j,TP2}|^2 P}{N_{j,TP2}}$ is a non-CoMP SINR (for SIMO system), with $N_{j,TP2}$ being defined as noise plus interference power from all TPs, except the serving TP.

From the derivation above, the detection strategy, power sharing optimization and greedy pairing algorithm can be summarized for the MU-SCMA-CoMP remote pairing scheme. For the detection strategy at the bad UE 620, data from TP1 and TP2 can be jointly detected, assuming the signal for the good UE 620 from TP2 is interference. Alternatively, regarding the sum rate, data for the bad UE 620 from TP2 is first detected, assuming the signal from TP1 and that for the good UE 620 from TP2 are interferences.

The data for the bad UE 620 from TP1 can be detected, assuming only the signal for the good UE 620 from TP2 as interference. The respective rates can be expressed as:

$$\tilde{r}_{i,TP1} = \log_2 \det\left(I + \frac{\gamma_{i,TP1}^{CoMP}}{J_{i,TP1}(1+(1-\alpha)\gamma_{i,TP2}^{CoMP})}S_{i,TP1}^H S_{i,TP1}\right),$$

$$\tilde{r}_{i,TP2} = \log_2 \det\left(I + \frac{\alpha\gamma_{i,TP2}^{CoMP}}{J_{i,TP2}(1+\gamma_{i,TP1}^{CoMP}+(1-\alpha)\gamma_{i,TP2}^{CoMP})}S_{i,TP2}^H S_{i,TP2}\right).$$

At the good UE 620, for a degraded system, it is assumed that data for the bad UE 620 from TP2 can be detected and completely canceled out. Hence, the data for the good UE 620 is detected, assuming only the signal for the bad UE 620 from TP1 is interference. The rate can be expressed by:

$$\tilde{r}_{j,TP2} = \log_2 \det\left(I + \frac{(1-\alpha)\gamma_{j,TP2}}{J_{j,TP2}}S_{j,TP2}^H S_{j,TP2}\right).$$

If the data for the UE i from TP2 cannot be detected at the good UE 620, then the signal for the UE j from TP2 is added as interference.

The weighted sum rate (WSR) of the two UEs 620 can be used in the power sharing factor optimization based on a maximum WSR criterion, such as:

$$WSR_{i,j}(\alpha) = w_i(\tilde{r}_{i,TP1} + \tilde{r}_{i,TP2}) + w_j \tilde{r}_{j,TP2}.$$

The optimal solution $0 \leq \alpha^* \leq 1$ is the solution of $$\frac{dWSR(\alpha)}{d\alpha} = 0.$$

In the case of SCMA where S=[1] (e.g., for a OFDMA system), the solution can be found by:

$$\alpha^* = \frac{w_i \gamma_{i,TP2}^{CoMP}(1+\gamma_{j,TP2}) - w_j \gamma_{j,TP2}(1+\gamma_{i,TP2}^{CoMP})}{(w_i - w_j)\gamma_{i,TP2}^{CoMP}\gamma_{j,TP2}},$$

where $w_i = \frac{1}{R_i}$, with $R_i$ being average rate of user i.

A greedy UE-pairing algorithm can be used to pair UEs for the OL MU-SCMA-CoMP transmission. First, a UE i* is selected in TP1, based on single-TP proportional fairness (PF) scheduling as follows:

$$i^* = \arg\max_{u_i \in TP1} w_i r_i.$$

Next, for the given UE i*, UE j* is selected in TP2 such that $WSR_{i^*,j^*}(\alpha^*)$ is maximized. This greedy UE-pairing algorithm can reduce a search space to only the number of UEs associated with cooperating TPs, rather than all possible pairs of UEs between these TPs. The reciprocal procedure is also done at TP2 since it is possible that TP1 helps a CoMP UE associated with TP2.

Figure 7:
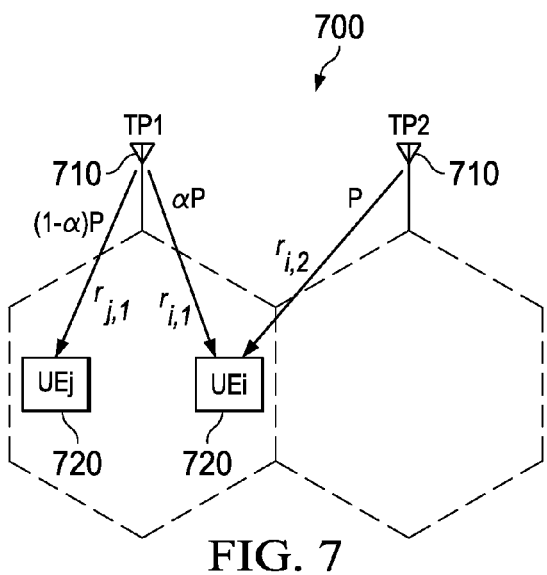
FIG. 7 illustrates an embodiment of a MU-SCMA-CoMP local pairing.

FIG. 7 shows an embodiment of a MU-SCMA-CoMP local pairing scenario, where two UEs 720 are in the same cell. One UE 720 is a cell-center CoMP UE or good UE, i.e. UE j, and another is a cell-edge UE or bad UE, i.e., UE i. The system can implement a SM scheme or a transmission diversity scheme to transmit data from multiple TPs to CoMP UEs. Both TPs 710 transmit data to the CoMP UE 720. For the detection strategy at the bad UE 720, data from TP1 and TP2 can be jointly detected, assuming the signal for the good UE 720 from TP2 is interference. Alternatively, for the ease in optimizing the power sharing factors, regarding the sum rate, data for this UE 720 from TP1 is first detected, assuming the signal from TP2 and that for the good UE 720 from TP1 are interferences. The data for this UE 720 from TP2 can be detected, assuming only the signal for the good UE 720 from TP1 as interference. This rates can be expressed as:

$$\tilde{r}_{i,TP1} = \log_2 \det\left(I + \frac{\alpha\gamma_{i,TP1}^{CoMP}}{J_{i,TP1}(1+(1-\alpha)\gamma_{i,TP1}^{CoMP}+\gamma_{i,TP2}^{CoMP})}S_{i,TP1}^H S_{i,TP1}\right),$$

$$\tilde{r}_{i,TP2} = \log_2 \det\left(I + \frac{\gamma_{i,TP2}^{CoMP}}{J_{i,TP2}(1+(1-\alpha)\gamma_{i,TP1}^{CoMP})}S_{i,TP2}^H S_{i,TP2}\right).$$

At the good UE 720, for a degraded system, it is assumed that data for the bad UE 720 from TP1 can be detected and completely canceled out. Hence, the data for the good UE 720 is detected, assuming only the signal for the bad UE 720 from TP2 is an interference. The rate can be expressed by:

$$\tilde{r}_{j,TP1} = \log_2 \det\left(I + \frac{(1-\alpha)\gamma_{j,TP1}}{J_{j,TP1}}S_{j,TP1}^H S_{j,TP1}\right).$$

Similar to the remote-pairing case, the power sharing factor optimization for the local-pairing scenario is based on a maximum weighted sum rate criterion as:

$$WSR_{i,j}(\alpha) = w_i(\tilde{r}_{i,TP1} + \tilde{r}_{i,TP2}) + w_j \tilde{r}_{j,TP2}.$$

In the case of SCMA where S=[1] (e.g., for a OFDMA system), the solution can be found by:

$$\alpha^* = \frac{w_i \gamma_{i,TP1}^{CoMP}(1+\gamma_{j,TP1}) - w_j \gamma_{j,TP1}(1+\gamma_{i,TP1}^{CoMP})}{(w_i - w_j)\gamma_{i,TP1}^{CoMP}\gamma_{j,TP1}},$$

where $w_i = \frac{1}{R_i}$, with $R_i$ being average rate of user i.

A greedy UE-pairing algorithm can be also used to pair UEs for the OL MU-CoMP transmission in the local-pairing scenario. First, a UE i* is selected in TP1, based on single-TP proportional fairness (PF) scheduling as follows:

$$i^* = \arg\max_{u_i \in TP1} w_i r_i.$$

Next, for the given UE i*, UE j* is selected in TP1 such that $WSR_{i^*,j^*}(\alpha^*)$ is maximized.

Figure 8:
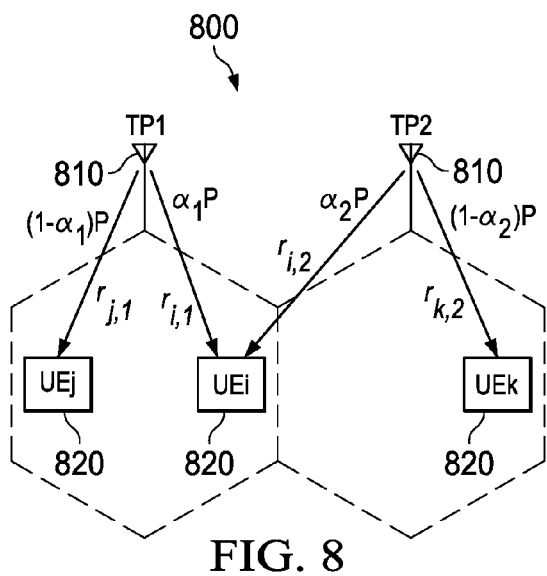
FIG. 8 illustrates an embodiment of a MU-SCMA-CoMP dual pairing.

FIG. 8 shows an embodiment of a MU-SCMA-CoMP dual pairing scenario, where UE j and UE k are cell-center UEs 820 (or good UEs), in TPs 810, TP1 and TP2, respectively. UE i is a cell-edge CoMP UE 820 (or bad UE). Both good UEs 820 have higher SINR than the bad UE 820. For the detection strategy at the bad UE 820, data from TP1 and TP2 can be jointly detected, assuming the signal for good UE j from TP1 and good UEk from TP2 are interferences. Alternatively, regarding the sum rate, data for UE j from TP1 is first detected, assuming the signals from TP2 and signals for the good UEs from TP1 and TP2 are interferences. Data for UE j from TP2 can then be detected assuming only the signal for good UEs from TP1 and TP2 are interferences. The rates can be expressed as:

$$\tilde{r}_{i,TP1} = \log_2 \det\left(I + \frac{\alpha_1 \gamma_{i,TP1}}{J_{i,TP1}(1+(1-\alpha_1)\gamma_{i,TP1})} S_{i,TP1}^H S_{i,TP1}\right),$$

$$\tilde{r}_{i,TP2} = \log_2 \det\left(I + \frac{\alpha_2 \gamma_{i,TP2}^{CoMP}}{J_{i,TP2}(1+(1-\alpha_1)\gamma_{i,TP1}^{CoMP}+(1-\alpha_2)\gamma_{i,TP2}^{CoMP})} S_{i,TP2}^H S_{i,TP2}\right).$$

At the good UE j, for a degraded system, it is assumed that data for the bad UE 820 from TP1 can be detected and completely canceled out. Hence, the data for good UE j is detected, assuming only signals from TP2 are interference. The rate can be expressed by:

$$\tilde{r}_{j,TP1} = \log_2 \det\left(I + \frac{(1-\alpha_1)\gamma_{j,TP1}}{J_{j,TP1}} S_{j,TP1}^H S_{j,TP1}\right).$$

At good UE k, first, the data for good UE k is detected, assuming only signals from TP1 are interferences. The rate can be expressed by:

$$\tilde{r}_{k,TP2} = \log_2 \det\left(I + \frac{(1-\alpha_2)\gamma_{k,TP2}}{J_{k,TP2}} S_{k,TP2}^H S_{k,TP2}\right).$$

However, since the data from TP2 to the bad UE 820 is obtained, assuming the data from TP1 to the bad UE 820 has been cancelled out completely (resulting in higher rate). This requires checking whether data for UE i from TP2 can be detected at good UE k.

The following weighted sum rate is used in the power sharing factors optimization for the dual-pairing scenario, based a on maximum WSR criterion:

$$WSR_{i,j}(\alpha) = w_i(\tilde{r}_{i,TP1}+\tilde{r}_{i,TP2})+w_j\tilde{r}_{j,TP2}.$$

The power sharing optimization can be implemented by the following steps:
1. Optimize $WSR_{i,j,k}(\alpha_1, \alpha_2)$ with respect to $\alpha_1$, to obtain $\alpha^*_1 = f(\alpha_2)$;
2. Substitute $\alpha_1 = \alpha^*_1$ into $WSR_{i,j,k}(\alpha_1, \alpha_2)$ to obtain $WSR_{i,j,k}(\alpha^*_1, \alpha_2)$;
3. Optimize $WSR_{i,j,k}(\alpha^*_1, \alpha_2)$ with respect to $\alpha_2$ to obtain $\alpha^*_2$; and
4. Substitute $\alpha_2 = \alpha^*_2$ back to $\alpha^*_1 = f(\alpha_2)$ to obtain $\alpha^*_1$.

The close-form expressions for $\alpha^*_1$ and $\alpha^*_2$ can be applied as:

$$\alpha_1^* = 1 + \frac{w_i \gamma_{i,TP1}^{CoMP} - w_j \gamma_{j,TP1} + (\alpha_2^* - 1)w_j \gamma_{i,TP2}^{CoMP} \gamma_{j,TP1}}{(w_i - w_j)\gamma_{i,TP1}^{CoMP} \gamma_{j,TP1}}; \text{ and}$$

$$\alpha_2^* = 1 + \frac{(w_j - w_i)\gamma_{i,TP2}^{CoMP} \gamma_{j,TP1} + w_k \gamma_{k,TP2}(\gamma_{j,TP1} - \gamma_{i,TP1}^{CoMP})}{(w_j - w_i + w_k)\gamma_{i,TP2}^{CoMP} \gamma_{j,TP1} \gamma_{k,TP2}}.$$

A greedy UE-pairing algorithm can be used to pair the UEs for the OL MU-SCMA-CoMP transmission in the dual-pairing scenario. First, for a given pair of cooperating cells, e.g., TP1 and TP2, cell-center UEs 820 are chosen in TP1 and TP2, each based on the MU-SCMA pairing. Hence, the UEs j, k are obtained from TP1 and TP2, respectively. The overall UEs (except UE j) are then searched in TP1 to find a cell-edge UE in a 6-UE pairing, where power sharing factors are optimized for each paring. The 6-UE pair which provides the maximum WSR is hence scheduled.

Figure 9A:
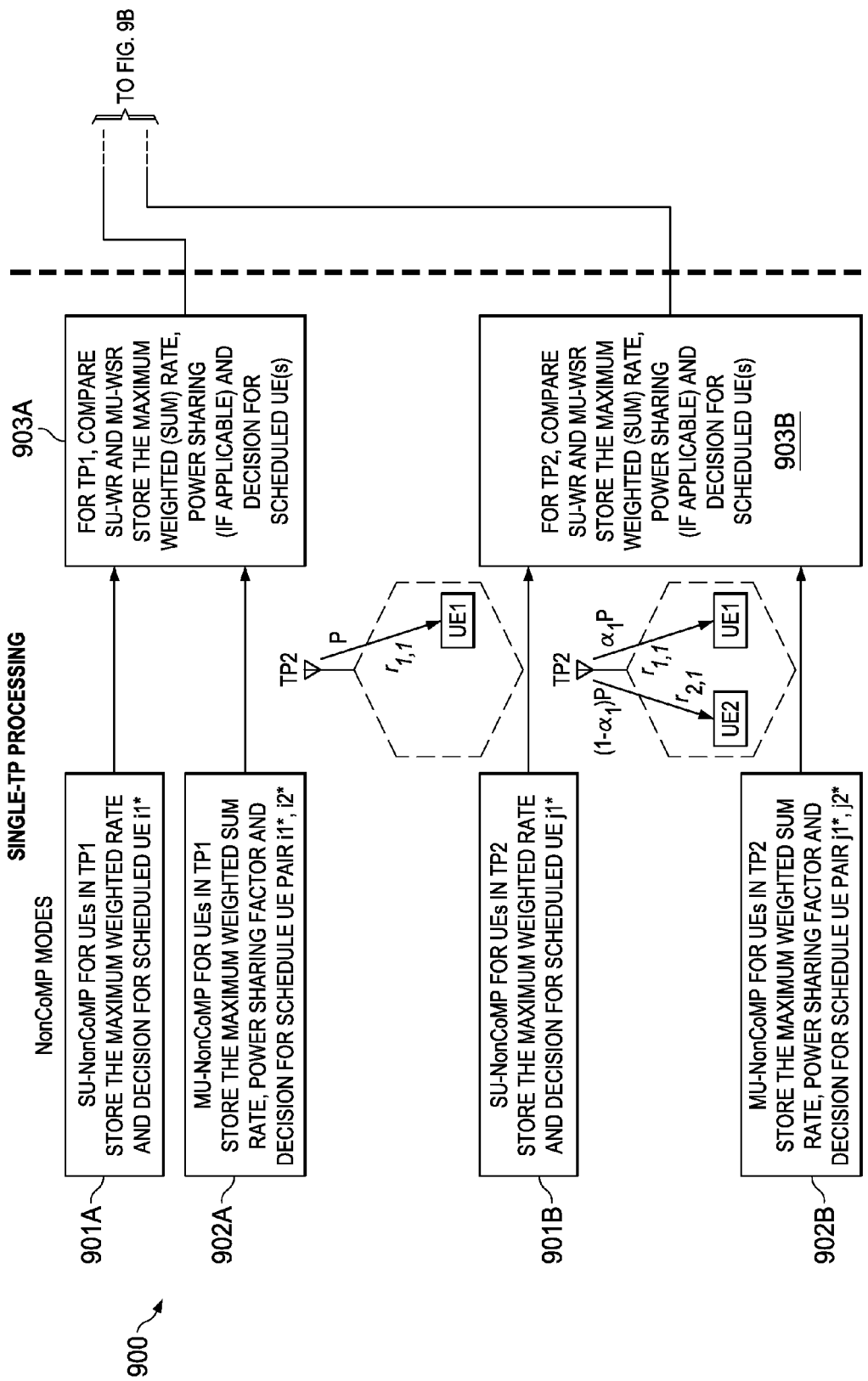
FIGS. 9A and 9B illustrates an embodiment of an OL MU-SCMA-CoMP transmission system.
Figure 9B:
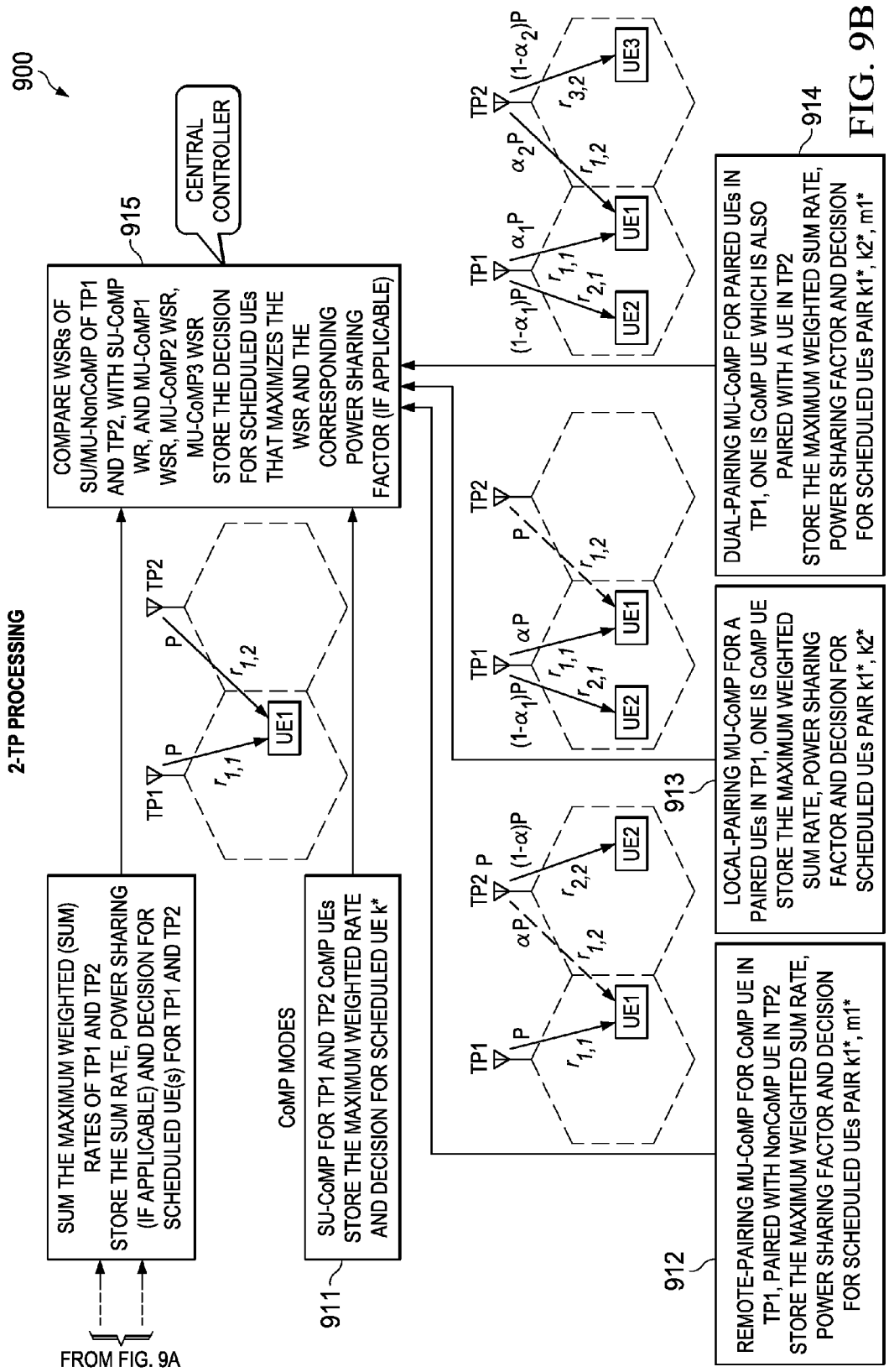

In the MU-SCMA-CoMP pairing scenarios above, the set of UEs in the cells that maximizes the weighted sum rate of the whole cluster are scheduled, as shown in FIGS. 9A and 9B. The scheduling can be performed by one or more controllers associated with the TPs or cells and/or a network central controller. The scheduling can included single-TP processing steps for non-CoMP transmission modes and a 2-TP processing step for scheduling joint transmissions from two TPs. In this example, a PF scheduling algorithm is used for a 2-TP cluster. Each cell (single-TP processing) in the cluster performs a single-TP PF scheduling (either in SU or MU mode). Next, in the CoMP mode, cooperating TPs (2-TP processing) jointly schedules the UEs in CoMP modes with local, remote or dual pairing. The mode that provides the maximum WSR and its associated UE or UEs are scheduled at each transmission time interval (TTI).

In the single-TP processing part, each cell in the cluster first performs a single-TP single-user (SU) PF scheduling, and registers the scheduled UEs and their corresponding PF metrics, as shown in step 901A for TP1 and step 901B for TP2. Next, each cell performs MU PF scheduling, as shown in step 902A for TP1 and step 902B for TP2. If the MU PF metric is larger than the SU PF metric, then another UE (e.g., the one paired with the scheduled UE from SU PF scheduling) is added to the already scheduled UE in that cell, and the corresponding sum PF metric is kept, as shown in step 903A for TP 1 and step 903B for TP 9.

In the 2-TP processing part, SU-CoMP scheduling is performed, at step 911, for all possible CoMP sets in the cluster. If the PF metric of a UE in a CoMP set together with the sum of PF metrics (from steps 903A and 903B) over the rest of the cells in the cluster is maximum over all CoMP sets, then the sum PF metric of this mode and the corresponding UEs are kept in a SU-CoMP metric. For example, considering a CoMP-set of size 2 (i.e., with 2 TPs cooperating) in a cluster of 7 TPs (with TPs 1 to 7), the CoMP-set can consist of TPs 1 and 2 with the remaining TPs 3 to 7 outside the CoMP set. Thus, the candidate sum PF metric includes a PF of CoMP UEs under the cooperating set of TPs 1 and 2, and a sum of PF metrics associated with the Non-CoMP mode in TPs 3 to 7 (which can be either SU-NonCoMP or MU-NonCoMP, whichever is higher). Similarly, another possible CoMP set can consist of TPs 2 and 3, with the remaining TPS 1 and 4 to 7 within the cluster but outside the CoMP set. At step 912, remote-pairing MU-CoMP is performed for all possible CoMP sets in the cluster. If the PF metric of a UE in a CoMP set together with the sum of PF metrics (resulting from steps 903A and 903B) over the rest of the cells in the cluster is maximum over all CoMP sets, then the sum PF metric of this mode and the corresponding UEs are kept in a remote-paring MU-CoMP metric. At step 913, local-pairing MU-CoMP is performed for all possible CoMP sets in the cluster. If the PF metric of a UE in a CoMP set together with the sum of PF metrics (from steps 903A and 903B) over the rest of the cells in the cluster is maximum over all CoMP sets, then the sum PF metric of this mode and the corresponding UE are kept in a local-paring MU-CoMP metric. At step 914, dual-pairing MU-CoMP is performed for all possible CoMP sets in the cluster. If the PF metric of a UE in a CoMP set together with the sum of PF metrics (from steps 903A and 903B) over the rest of the cells in the cluster is maximum over all CoMP sets, then the sum PF metric of this mode and the corresponding UEs are kept in a dual-paring MU-CoMP metric.

At step 915, the set of UEs that maximizes the PF metric over all non-CoMP and CoMP modes is selected for the scheduling.

The MU-CoMP systems can use channel quality indicator (CQI) feedback from UEs to determine scheduling and CoMP mode selection. In the case of 9 TPs in the cluster as described above, two sets of SINRs for each UE are fed back to a central controller. For a non-CoMP SINR (SU-non-CoMP), $\gamma_{i,j}$, the SINR can be associated with a UE i and its serving TP j. For the non-CoMP mode, the interferences are from all TPs outside the serving TP of the UE i. For a CoMP SINR (either SU-CoMP or MU-CoMP), $\gamma_{i,j}^{CoMP}$, the SINR is associated with a UE i and from TP j, where TP j is in the CoMP set (in 2 cooperating TPs). For the CoMP SINR, the interferences are from all cells outside the CoMP set of the UE i. For the calculation of feedback CoMP SINR, the open-loop channel capacity between UE i and TP1 and TP2 (i.e., $C_{i,TP1}$, $C_{i,TP2}$) using SU-CoMP mode is first calculated. The capacity is calculated based on actual short term fading to the UE from all cooperating TPs, dominant interference TPs at the time of the feedback, and based on the assumed interference pattern (from interference signature matrix). The value $\gamma_{i,TP1}^{CoMP}$ can be first calculated based on $C_{i,TP2}$, and $\gamma_{i,TP1}^{CoMP}$ can be calculated based on the relations:

$$C_{i,TP1} = \log_2 \det\left(I + \frac{\gamma_{i,TP1}^{CoMP}}{J_{i,TP1}(1+\gamma_{i,TP2}^{CoMP})} S_{i,TP1}^H S_{i,TP1}\right), \text{ and}$$

$$C_{i,TP2} = \log_2 \det\left(I + \frac{\gamma_{i,TP2}^{CoMP}}{J_{i,TP2}} S_{i,TP2}^H S_{i,TP2}\right).$$

Figure 10:
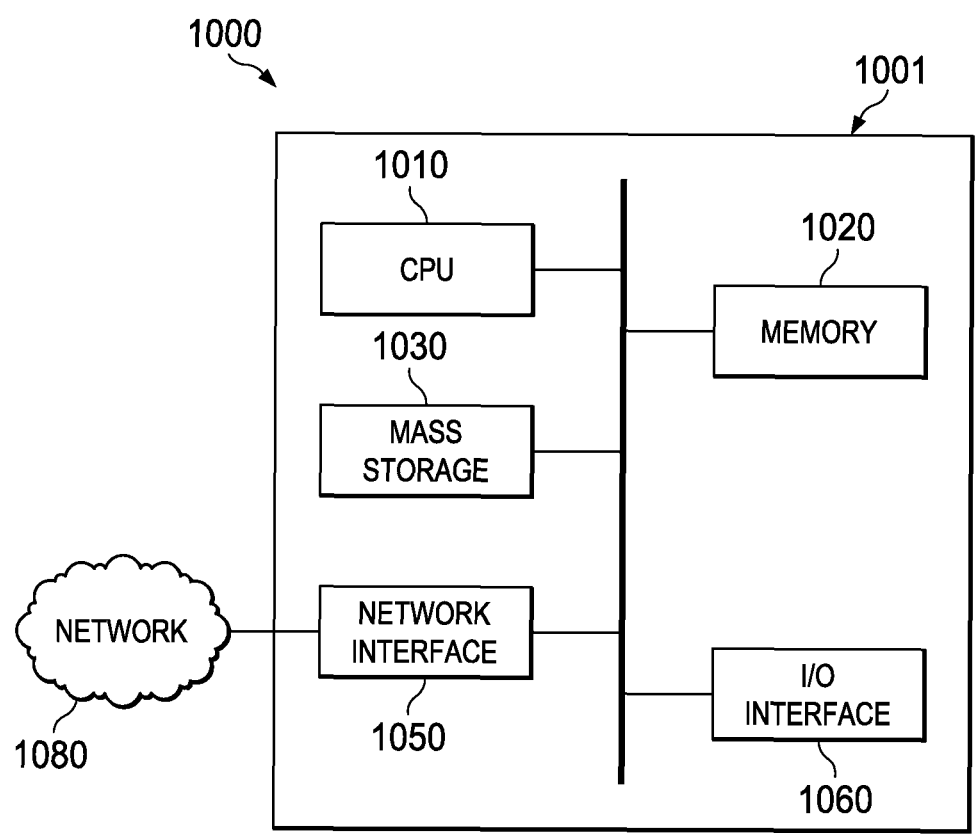
FIG. 10 is a diagram of a processing system that can be used to implement various embodiments.

In an embodiment, the MU-SCMA-CoMP scheme can be extended to the MIMO scenario, where each TP and UE is equipped with multiple antennas. An open-loop SM transmission mode can be used in which multiple independent data streams can be transmitted from each TP. For example, a 2×2 open-loop SM transmission mode is implemented where the TP and UE is each equipped with two antennas and two independent data streams are transmitted from the TP. Alternatively, a transmit diversity mode can be used with multiple antennas at each component in which the same data stream can be transmitted from each TP. Further, in the case the transmit power per TP is made fixed, the power is divided among the multiple antennas. In the MIMO transmission scenario, the MIMO CQI feedback calculation (at the UE) can be similar to a CQI feedback calculation in a single-input and multiple-output (SIMO) transmission scheme. For example, to calculate the CQI feedback in the MIMO system between two cooperating TPs and a UE, two MIMO channel capacities associated with two cooperating TPs are calculated. In an embodiment, $n_c$ independent data streams are transmitted over $n_c$ parallel channels ($n_c$ is an integer) in each MIMO channel and each independent channel is assumed to have the same capacity (i.e., MIMO capacity/$n_c$). The capacity for each independent channel can be considered similar to the channel capacity in the SIMO system. This capacity is then used in the calculation of SIMO post-processing SINR (CQI) feedback. To perform MIMO rate calculation based on feedback SIMO SINR, the SIMO rate is first calculated based on the SIMO post-processing SINR. The MIMO rate is then obtained by multiplying the SIMO rate with the number of independent channels, $n_c$. FIG. 10 is a block diagram of an exemplary processing system 1000 that can be used to implement various embodiments. For instance, the system 1000 can be part of a controller, a TP, or a UE. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for open-loop multi-user coordinated multipoint (CoMP) transmission, the method comprising:
scheduling, for a cluster of multiple transmission points (TPs) and multiple user equipment (UEs), a set of UEs for data transmission from a set of TPs by coordinating and allocating, for each TP in the set of TPs, a plurality of non-orthogonal multiple access layers to the set of UEs in accordance with a MU CoMP with non-orthogonal multiple access transmission mode and a UE-UE pairing scheme, wherein the MU CoMP with non-orthogonal multiple access transmission mode and the UE-UE pairing scheme are selected in accordance with a criterion; and
assigning to the set of TPs a control signaling for configuring the set of UEs, wherein the control signaling indicates a plurality of parameters based on the scheduling.

2. The method of claim 1, wherein the control signaling indicates the selected MU CoMP with non-orthogonal multiple access transmission mode, a number and indices of TPs for each UE in the set of UEs, a number and indices of layers of each TP in the set of TPs, and a power sharing factor, a codebook size and a code rate of each layer.

3. The method of claim 1, wherein scheduling for each TP in the set of TPs a plurality of non-orthogonal multiple access layers to the UEs is determined in accordance with channel quality indicator (CQI) feedback from the set of UEs, the CQI feedback indicating a measurement in accordance with a reference signal.

4. The method of claim 3, wherein the CQI feedback indicates a number of non-orthogonal multiple access layers measured by each UE for each TP.

5. The method of claim 3, wherein the CQI feedback includes a CoMP CQI report for a CoMP transmission mode, and a non-CoMP CQI report for a non-CoMP transmission mode.

6. The method of claim 1, wherein the scheduling includes pairing, according to the UE-UE pairing scheme, the UEs in the set of UEs with the TPs in the set of TPs for data transmission based on the criterion.

7. The method of claim 1, wherein the scheduling includes assigning available resource, including power and non-orthogonal multiple access layers, for data transmission between the set of TPs and the set of UEs based on the criterion, for each given time, frequency or space resource.

8. The method of claim 7, wherein the scheduling includes adjusting a rate and a number of non-orthogonal multiple access layers to the UEs based on the assigned power.

9. The method of claim 1, wherein the criterion comprises selecting a transmission mode with a maximum weighted sum rate (WSR).

10. The method of claim 1, wherein the MU CoMP with non-orthogonal multiple access transmission mode and the UE-UE pairing scheme is selected according to the criterion from a plurality of possible configurations for non-orthogonal multiple access and CoMP transmission modes including single-user (SU) or MU sparse code multiple access (SCMA), SU CoMP with SCMA, and MU CoMP with SCMA and various UE-TP pairing schemes.

11. The method of claim 10, wherein the various UE-TP pairing schemes include pairing a plurality of UEs, which are not associated with a cell coverage, with a plurality of TPs.

12. The method of claim 10, wherein the various UE-TP pairing schemes include a remote pairing scheme where at least one cell-edge UE is paired with a first TP and with a second remote TP serving at least one second remote UE, a local pairing scheme where at least one cell-edge UE is paired with a first TP serving at least one second UE and with a second remote TP, and a dual pairing scheme where at least one cell-edge UE is paired with a first TP serving at least one second UE and with a second remote TP serving a third remote UE.

13. The method of claim 10, wherein a number of UEs is served by a same or different number of TPs, and wherein each UE of the UEs is served by at least one of the TPs.

14. The method of claim 13, wherein each TP of the TPs has a cellular service area.

15. The method of claim 1, wherein the MU CoMP with non-orthogonal multiple access transmission mode is established without a precoding matrix and associated feedback from the UEs.

16. The method of claim 1, wherein the data transmission from the set of TPs is a multiple-input and multiple-output (MIMO) transmission using multiple antennas at each TP.

17. The method of claim 16, wherein the data transmission from each TP in the set of TPs is according to a spatial multiplexing (SM) scheme for sending different data to each UE in the set of UEs.

18. The method of claim 16, wherein the data transmission from each TP in the set of TPs is according to a transmission diversity scheme for sending same data to each UE in the set of UEs.

19. A method for enabling open-loop multi-user coordinated multipoint (CoMP) transmission, the method comprising:
receiving, at a transmission point (TP) from a network controller, a plurality of parameters for a control signaling assigned to the TP; and
transmitting the control signaling to a set of user equipment (UEs) associated with the TP, wherein the control signaling indicates scheduling information for the set of UEs transmission from a set of TPs in accordance with a selected multi-user (MU) CoMP with non-orthogonal multiple access transmission mode and a UE-UE pairing scheme, and wherein the parameters include a number and indices of non-orthogonal multiple access layers of each TP in the set of TPs.

20. The method of claim 19, wherein the parameters for the control signaling includes the selected MU CoMP with non-orthogonal multiple access transmission mode, a number and indices of TPs for each UE in the set of UEs, and a power sharing factor, a codebook size and a code rate of each non-orthogonal multiple access layer.

21. The method of claim 19 further comprising:
sending a reference signal to each UE associated with the TP;
receiving, from each UE, a channel quality indicator (CQI) feedback indicating a measurement in accordance with the reference signal; and
forwarding the CQI feedback to the network controller.

22. The method of claim 21, wherein the CQI feedback indicates a number of non-orthogonal multiple access layers measured by each UE.

23. The method of claim 21, wherein the measurement is a CoMP signal-to-interference-plus-noise (SINR) or a non-CoMP SINR for the set of TPs associated with each UE.

24. The method of claim 21, wherein the parameters for the control signaling, including the number and indices of non-orthogonal multiple access layers of each TP in the set of TPs, are in accordance with the CQI feedback from each UE.

25. A method for enabling open-loop multi-user coordinated multipoint (CoMP) transmission, the method comprising:
receiving, at a user equipment (UE), a control signaling for scheduling data transmission in accordance with a selected multi-user (MU) CoMP with non-orthogonal multiple access transmission mode and a UE-UE pairing scheme; and
detecting a data transmission from a set of TPs in accordance with the selected MU CoMP with non-orthogonal multiple access transmission mode and the UE-UE pairing scheme, wherein the control signaling indicates a number and indices of non-orthogonal multiple access layers of each TP in the set of TPs.

26. The method of claim 25, wherein the control signaling further indicates a codebook size and a code rate for each non-orthogonal multiple access layer.

27. The method of claim 25 further comprising:
receiving, from each TP in the set of TPs, a reference signal; and
sending, a channel quality indicator (CQI) feedback indicating a measurement in accordance with a reference signal.

28. The method of claim 27, wherein the CQI feedback indicates a number of non-orthogonal multiple access layers measured by the UE for each TP.

29. The method of claim 27, wherein the measurement is a CoMP signal-to-interference-plus-noise (SINR) or a non-CoMP SINR for the set of TPs associated with the UE.

30. The method of claim 27, wherein the control signaling is in accordance with the CQI feedback from the UE.

31. A network controller for enabling open-loop multi-user coordinated multipoint (CoMP) transmission, the network controller comprising:
a processor coupled to a memory; and
a non-transitory computer readable storage medium storing programming for execution by the processor, the programming including instructions to:
schedule, for a cluster of multiple transmission points (TPs) and multiple user equipment (UEs), a set of UEs for data transmission from a set of TPs by coordinating and allocating, for each TP in the set of TPs, a plurality of non-orthogonal multiple access layers to the set of UEs in accordance with a MU CoMP with non-orthogonal multiple access transmission mode and a UE-UE pairing scheme, wherein the MU CoMP with non-orthogonal multiple access transmission mode and the UE-UE pairing scheme are selected in accordance with a criterion; and
assign to the set of TPs a control signaling for configuring the set of UEs, wherein the control signaling indicates a plurality of parameters based on the scheduling.

32. The network controller of claim 31, wherein the programming includes instructions to schedule, for each TP in the set of TPs, a plurality of non-orthogonal multiple access layers to the UEs in accordance with channel quality indicator (CQI) feedback from the set of UEs, the CQI feedback indicating a measurement in accordance with a reference signal.

33. The network controller of claim 31, wherein the instructions to schedule the set of UEs for the data transmission from the set of TPs includes instructions to:
pair, according to the UE-UE pairing scheme, the UEs in the set of UEs with the TPs in the set of TPs for data transmission based on the criterion;
assign available resource, including power and non-orthogonal multiple access layers, for data transmission between the set of TPs and the set of UEs based on the criterion, for each given time, frequency or space resource; and
adjust a rate and a number of non-orthogonal multiple access layers to the UEs based on the assigned power.

34. A transmission point (TP) supporting open-loop multi-user coordinated multipoint (CoMP) transmission, the TP comprising:
a processor coupled to a memory; and
a non-transitory computer readable storage medium storing programming for execution by the processor, the programming including instructions to:
receive, from a network controller, a plurality of parameters for a control signaling assigned to the TP; and
transmit the control signaling to a set of user equipment (UEs) associated with the TP, wherein the control signaling indicates scheduling information for the set of UEs in accordance with a selected multi-user (MU) CoMP with non-orthogonal multiple access transmission mode and a UE-UE pairing scheme, and wherein the parameters include a number and indices of non-orthogonal multiple access layers of each TP in the set of TPs.

35. The TP of claim 34, wherein the programming includes further instructions to:
send a reference signal to each UE associated with the TP;
receive, from each UE, a channel quality indicator (CQI) feedback indicating a measurement in accordance with the reference signal; and
forward the CQI feedback to the network controller.

36. A user equipment (UE) supporting open-loop multi-user coordinated multipoint (CoMP) transmission, the UE comprising:
a processor coupled to a memory; and
a non-transitory computer readable storage medium storing programming for execution by the processor, the programming including instructions to:
receive a control signaling for scheduling data transmission in accordance with a selected multi-user (MU) CoMP with non-orthogonal multiple access transmission mode and a UE-UE pairing scheme; and
detect a data transmission from a set of TPs in accordance with the selected MU CoMP with non-orthogonal multiple access transmission mode and the UE-UE pairing scheme, wherein the control signaling indicates a number and indices of non-orthogonal multiple access layers of each TP in the set of TPs.

37. The UE of claim 36, wherein the programming includes further instructions to:
receive, from each TP in the set of TPs, a reference signal; and
send, a channel quality indicator (CQI) feedback indicating a measurement in accordance with a reference signal.

* * * * *